United States Patent

Brandi et al.

[11] Patent Number: 5,978,536
[45] Date of Patent: Nov. 2, 1999

[54] OPTICAL CABLE WITH CORE DECOUPLED FROM SHEATH AND YARN STRANDS UNIFORMLY ADHERING TO SHEATH

[75] Inventors: Giovanni Brandi; Massimo Pizzorno, both of Milan, Italy

[73] Assignee: Pirelli Cavi E Sistemi S.p.A., Milan, Italy

[21] Appl. No.: 08/928,649

[22] Filed: Sep. 12, 1997

[30] Foreign Application Priority Data

Sep. 16, 1996 [IT] Italy .................................. MI96A1899

[51] Int. Cl.⁶ ....................................................... G02B 6/44
[52] U.S. Cl. ............................................................... 385/102
[58] Field of Search ..................................... 385/100–113

[56] References Cited

U.S. PATENT DOCUMENTS

| | | | |
|---|---|---|---|
| 4,269,024 | 5/1981 | Asphole et al. | 57/232 |
| 4,787,702 | 11/1988 | Khalil et al. | |
| 4,859,025 | 8/1989 | Houghton | 385/100 |
| 4,893,893 | 1/1990 | Claxton et al. | |
| 4,932,746 | 6/1990 | Calzolari et al. | |
| 5,050,960 | 9/1991 | Sutehall | 385/113 |
| 5,627,932 | 5/1997 | Kiel et al. | |
| 5,822,485 | 10/1998 | Nelson et al. | |

FOREIGN PATENT DOCUMENTS

| | | |
|---|---|---|
| 0 468 878 A1 | 1/1992 | European Pat. Off. |
| 0 553 990 A1 | 8/1993 | European Pat. Off. |
| 2321133 | 3/1977 | France. |
| 2096343 | 10/1982 | United Kingdom. |
| 2296575 | 7/1996 | United Kingdom. |

*Primary Examiner*—Akm E. Ullah
*Attorney, Agent, or Firm*—Finnegan, Henderson, Farabow, Garrett & Dunner, L.L.P.

[57] ABSTRACT

An optical fiber cable including at least one module with at least two optical fibers enveloped by a plastic covering, a plastic sheath around the module, and tensile-resistant fibrous yarn strands arranged between the module and the plastic sheath. The sheath and the module are decoupled during manufacture by separate pulls on the module and yarn strands. The yarn strands are caused to adhere uniformly to the sheath, so that any stress to which the sheath is subjected in service is distributed uniformly within the core. The uniform adherence is preferably caused by one or more flexing actions performed on the cable during manufacture.

18 Claims, 4 Drawing Sheets

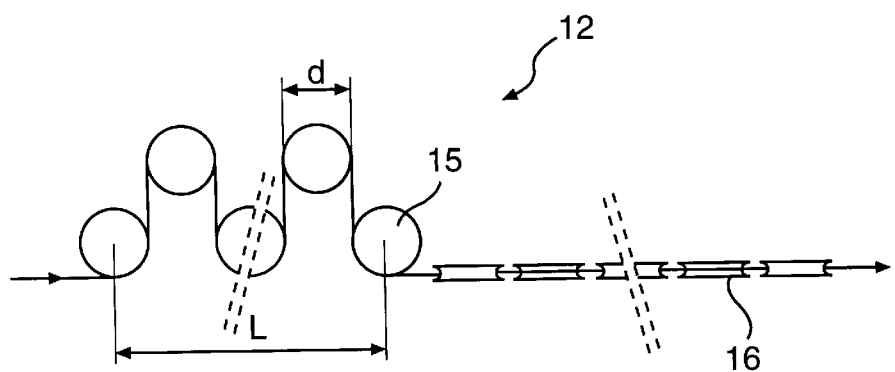
FIG. 6
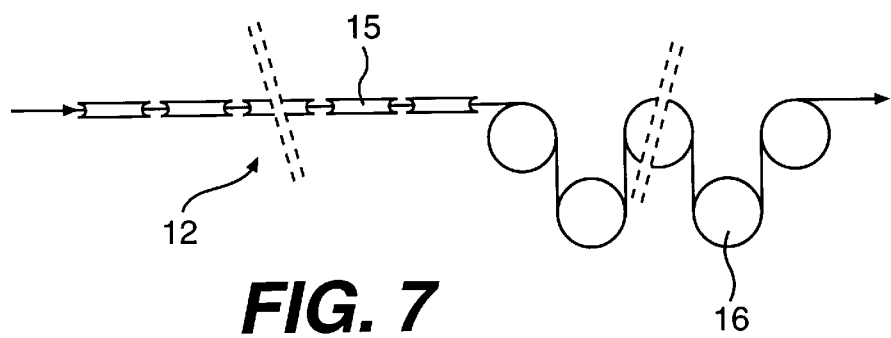
FIG. 7
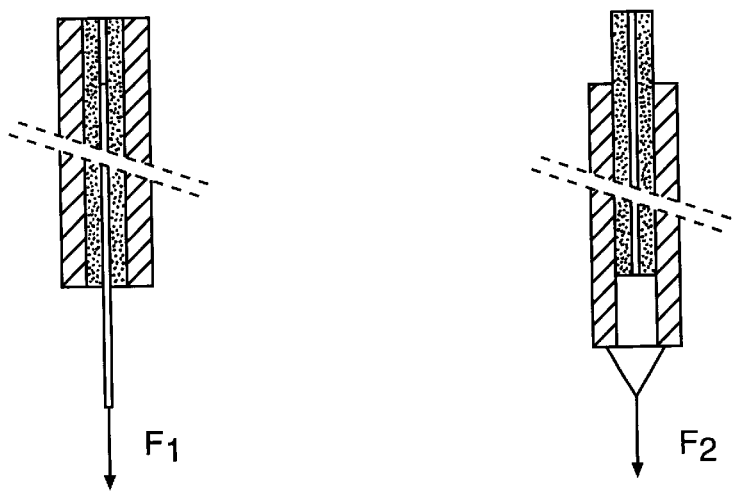
FIG. 8  FIG. 9

OPTICAL CABLE WITH CORE DECOUPLED FROM SHEATH AND YARN STRANDS UNIFORMLY ADHERING TO SHEATH

DESCRIPTION

This invention refers to an optical cable for telecommunication, in particular for data transmission on local area networks, for example for use in offices, civil buildings, hospitals and similar.

Telecommunication cables are known in which an optical core comprises at least one optical fiber surrounded by a number of protective coverings forming a single assembly, enveloped in turn by suitable means of reinforcement and covering.

In particular, U.S. Pat. No. 4,893,893 describes an optical cable for telecommunications comprising an optical fiber enveloped by a protective covering. At least one strand of fibrous material is deposited along the fiber and constitutes a strength member. An outer plastic layer surrounds the fibrous strand. Preferably three bundles of fibrous material are arranged equidistantly around the fiber, in a substantially longitudinal arrangement.

Patent application FR 2321133 shows a fiber-optic rural transmission line consisting of fiber-optic cable housed in a flexible tube. In one example, a group of seven glass fibers 100 mm in diameter, each with a plastic covering 0.8 mm in outside diameter, is surrounded by a single layer consisting of a plastic film 300 $\mu$m thick, enveloped in turn by a polyethylene sheath 0.5 mm thick; said cable slides freely inside a flexible tube provided with reinforcing elements.

Patent EP 0 468 878 refers to a fiber-optic communication cable, intended in particular for local area networks; the cable comprises a series of optical fibers placed inside a covering and divided into modules, each enveloped by a thin sheath. The sheaths are in contact with the optical fibers to engage them without decoupling, and the covering is in contact with the module sheaths to form a compact whole.

In laying the cable, e.g. in the case of installation of optical cables in pipe, a pulling device must be applied to the head of the cable, connected to the reinforcing elements. This operation is particularly delicate, since the tensile load must be suitably applied to the reinforcing elements to avoid creating serious stress on some optical fibers, with the risk of breaking them or boosting attenuation in service.

The Applicant has sought to produce an optical cable in which the attenuation of the optical fibers in service would remain low, the stress on the optical fibers caused in service by thermal shrinkage of the sheath would be negligible and the stress due to traction on the end of the cable during cable laying operations in pipe or similar would not jeopardize the integrity of one or more fibers.

In particular, the Applicant observed that operating according to the indications in patent EP 0 468 878, in which a thermoplastic sheath is extruded directly onto a plurality of optical modules, there were contractions of the sheath during cooling that could be transmitted to the optical fibers in each module, causing strong optical attenuation during cable service in some cases.

The Applicant thus discovered that a plurality of traction-resistant yarns parallel to the cable interposed between the outer sheath of the cable and the optical modules, comprising a number of fibers bundled by a common plastic covering, constituted a means of decoupling between sheath and fiber modules, such that in the cable manufacturing step, after extrusion of the sheath and during cooling, the sheath could not transmit the contractions of the plastic to the fibers, causing the aforesaid problems of attenuation measurable with known technology, at the same time minimizing the external dimensions of the cable.

Irregular inflections of the cable were observed, particularly as a result of the thermal shrinkage of the cable in service, such as to cause a state of mechanical stressing of the fibers and a consequent deterioration of the transmission characteristics of the cable. This phenomenon was attributed to the presence of non-uniform adhesion between yarns and extruded sheath in the longitudinal direction.

It was then discovered that this deterioration could be eliminated by means of a particular mechanical treatment imparted to the cable during manufacturing, comprising repeated flexures of the cable such as to break the points of irregular adhesion, thus making yarns and sheath uniformly adherent and thus distributing stress uniformly inside the cable, thus without possible harmful snaking of the cable or irregular flexures occasioned by thermal shrinkage.

It was also discovered that the placement of a single strength member between the outer sheath and the optical modules, in the form of yarns essentially parallel to the cable, could make it possible to effect, during installation in pipe, a single, simple connection between a specially-designed pulling chain and the aforesaid strength member, resulting in the uniform distribution of traction on the fibers.

According to a first aspect, the invention concerns an optical cable comprising at least one optical module, comprising at least two optical fibers surrounded by a jacket of polymer material, an extruded outer sheath enveloping said modules and a strength member, characterized by the fact that said strength member comprises a plurality of tensile-resistant yarns, which occupy all the space between the optical modules and the outer sheath, in which said yarns adhere uniformly to the external sheath, said optical modules being mechanically decoupled from said outer sheath and the attenuation of the optical fibers of said optical modules in the cable being less than three times the nominal value of the optical fiber after at least a thermal cycle of 24 hours between −20 and +70° C.

The optical cable according to the invention preferably has an outside diameter between 2 and 7 mm. Said yarns preferably have a elastic tensile module of at least 4000 kg/mm$^2$.

In particular, said yarns are composed of aramid (aromatic polyamide) fibers.

Said outer sheath is preferably of polyvinyl chloride.

The polymer material of the jacket of said optical modules is preferably a cross-linked acrylic resin or, as an alternative, a flame-retardant polymer compound or a thermoplastic resin.

According to one aspect of the invention, said uniform adherence of said yarns to the outer sheath is such that in a section of cable 500 mm long the regular unit force necessary to strip the outer sheath from the rest of the cable, comprising the yarns and optical modules, is between 20 and 60 g/mm, when the stripping force is applied at a rate of 15 mm/min. According to another aspect of the invention, said uniform adherence of said yarns to the outer sheath is such that in a section of cable 500 mm long the regular unit force necessary to strip an optical module from the remainder of the cable, comprising the yarns and outer sheath, is no greater than four times the unit operating strip force of an optical module with respect to the remainder of the cable, comprising the yarns and outer sheath.

According to another aspect of the invention, in a section of cable 500 mm long according to the invention the force necessary in service to strip an optical module from the remainder of the cable, comprising the yarns and outer sheath, is between 50 and 150 g per optical module, when the strip force is applied at a rate of 15 mm/min.

According to another aspect of the invention, a coil of the cable in a configuration with at least two coils regularly in contact, with an outside diameter of around 160 mm, displays no significant polygonization when said coil is subject to at least a thermal cycle of 4 hours between +70 and −30° C.

In another aspect the present invention concerns a procedure for manufacturing an optical cable for telecommunication, comprising at least one optical module with at least two optical fibers enveloped by a plastic jacket and a plastic sheath around the modules, which comprises the steps of:

advancing said optical module continuously between a starting station and a collection station;

extruding a thermoplastic sheath around the optical module;

cooling said sheath, characterized by the fact that it comprises the steps of:

applying a layer of flexible, tensile-resistant yarns between module and sheath;

extruding said thermoplastic sheath over said yarns;

cooling said extruded sheath;

making the yarns and sheath adhere uniformly to each other by removing points of adherence between sheath and yarns after the cooling of said extruded sheath.

In particular, the procedure is characterized by the fact that said step of making yarns and sheath adhere uniformly to each other comprises flexing said cable by at least 90°.

Preferably said flexing step comprises the execution of at least one flexure in at least two different incidental planes; more preferably, said flexures are performed in two mutually orthogonal planes.

In a preferred embodiment of the invention, at least two flexures of essentially 180° each are performed in opposite directions.

According to another aspect, the present invention concerns an optical cable obtained by means of the procedure described.

Further details are provided by the following description, with reference to the figures enclosed, being exclusively intended as illustrative and not limitative, of which:

Figure 1:
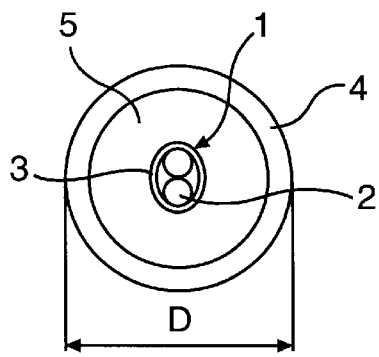
FIG. 1 shows a cross-sectional view of a telecommunication cable according to the invention, in a first embodiment.
Figure 2:
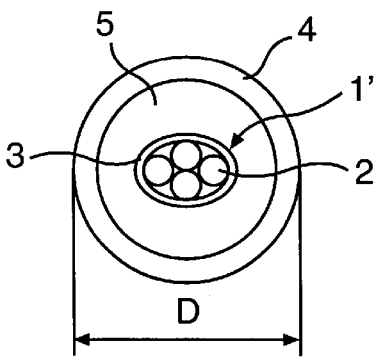
FIG. 2 shows a cross-sectional view of a telecommunication cable according to the invention, in a second embodiment.
Figure 3:
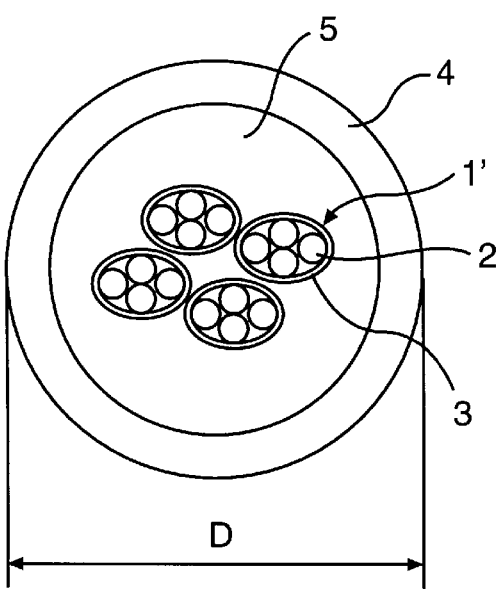
FIG. 3 shows a cross-sectional view of a telecommunication cable according to the invention, in a third embodiment.
Figure 4:
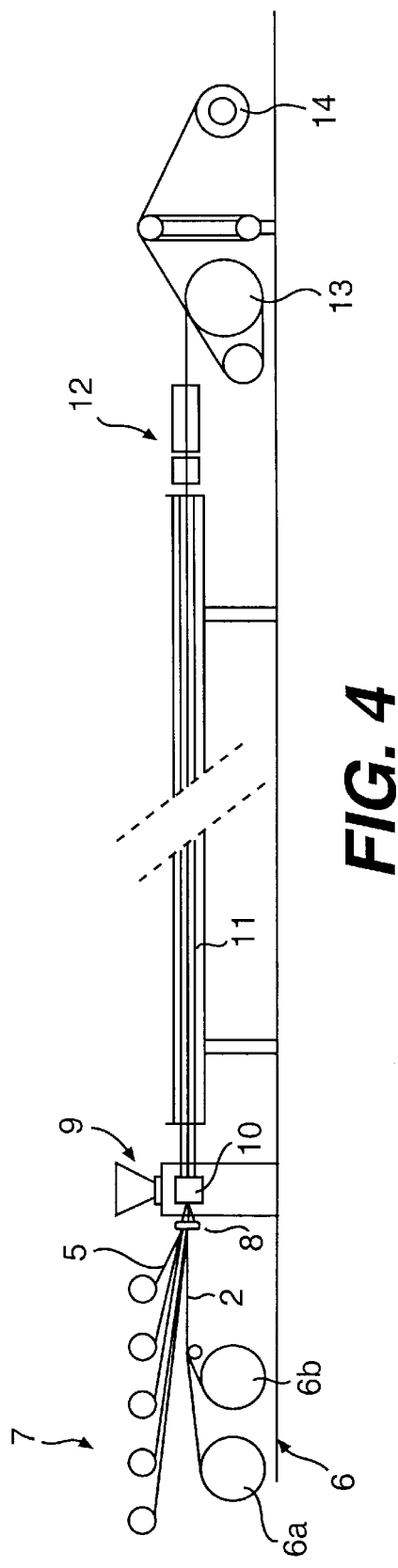
Figure 5:
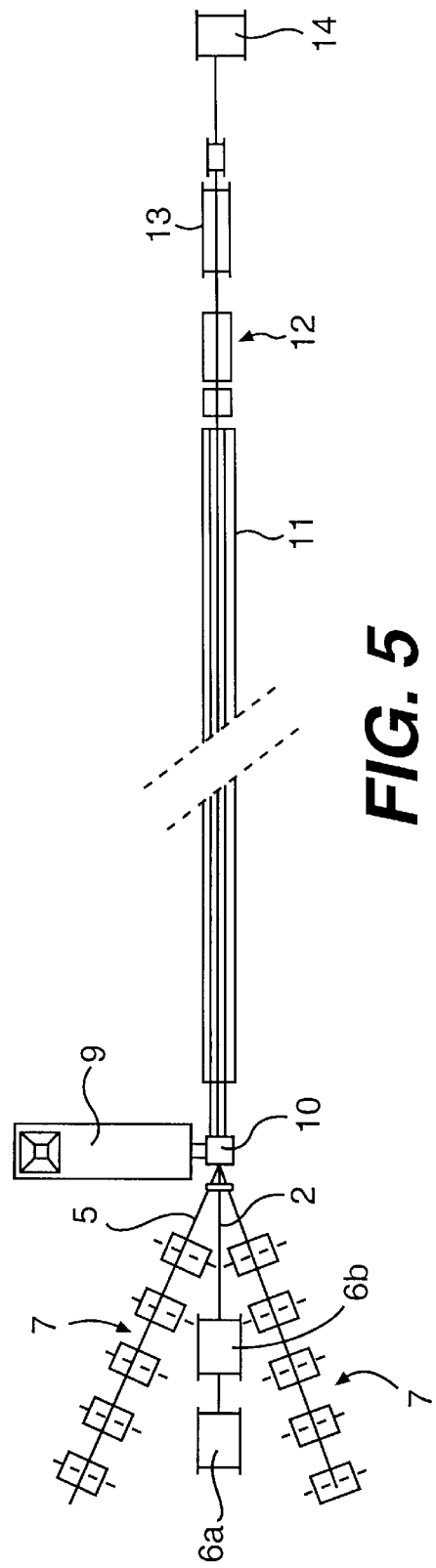
Figure 10:
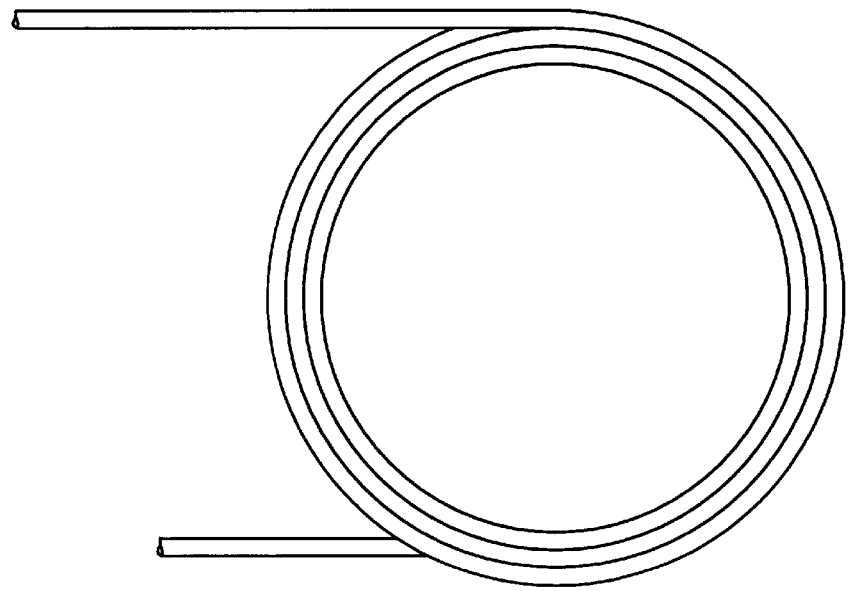
Figure 11:
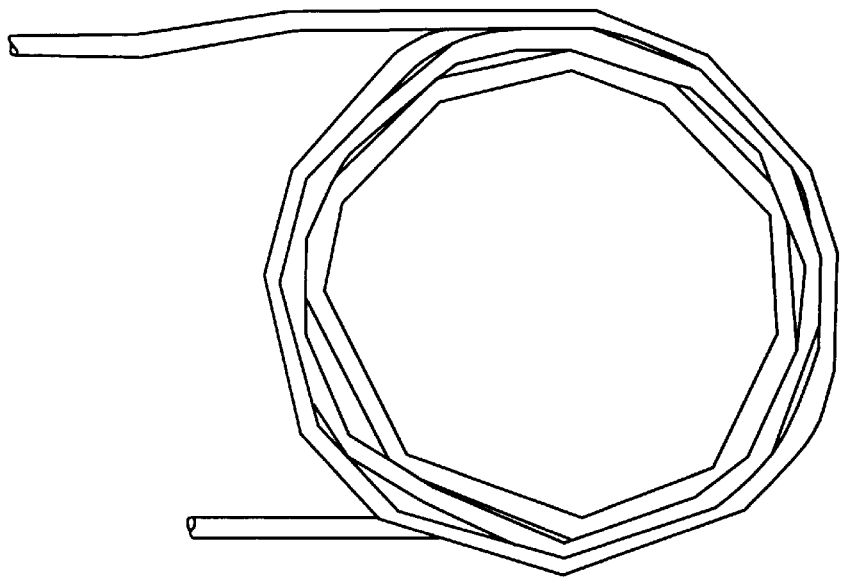

FIG. 4 shoes a lateral view of a line for manufacturing the cable of FIGS. 1–3;

FIG. 5 shows a plan view of the line in FIG. 4;

FIG. 6 shows a lateral view of an equalization device for the line in FIG. 4;

FIG. 7 shows a plan view of an equalization device for the line in FIG. 4;

FIG. 8 is a schematic representation of the testing method to determine the stripping load between the module and the rest of the cable;

FIG. 9 is a schematic representation of the testing method to determine the stripping load between the sheath and the rest of the cable;

FIG. 10 schematically shows a coil of cable manufactured with the device in FIG. 5, after exposure to the thermal cycles;

FIG. 11 schematically shows a coil of cable manufactured without the device of FIG. 5, after exposure to the thermal cycles.

FIGS. 1 to 3 illustrate three examples of optical cable for telecommunication according to the invention, intended in particular for connecting local area networks, as inside offices, civil buildings, hospitals, etc.

As FIG. 1 shows, a cable according to the invention comprises a module 1, formed of two optical fibers 2, enveloped by a plastic jacket 3; the module in turn is contained inside a plastic sheath 4.

Between the module 1 and the sheath 4 there is an interposed layer formed of a plurality of longitudinal yarns 5, flexible and tensile-resistant, that fills the empty spaces between module and sheath.

The cable in FIG. 2 differs from the preceding one in that inside the sheath 4 there is a single module 1' inside of which there are four optical fibers, while the cable in FIG. 3 differs from the preceding one in that it comprises four modules 1', each with four fibers, inserted in a single sheath 4 and surrounded by the layer of tensile-resistant yarns 5.

For simplicity of description, the identical elements in FIGS. 1–3 have been indicated with the same numbering.

It is also important to note that the cable could comprise any number of modules and that the fibers inside the modules could be three or more.

Preferably, the cable comprises a number of modules, and a number of fibers in each module, such that its total potential is between 2 and 20 fibers.

In one embodiment, each optical fiber is formed of a glass portion, with a core of 65 $\mu$m and cladding of 125 $\mu$m, surrounded by two layers of acrylates, designated collectively as the primary covering; as an alternative, each fiber is formed of a core of 65 $\mu$m and cladding of 100 $\mu$m, surrounded by three layers of acrylates of primary covering, resulting advantageously more flexible than the preceding one.

In both the examples described, the overall diameter of the optical fibers inclusive of primary covering is around 245–250 $\mu$m.

In particular embodiments there could be, in the same cable, modules with fibers of the first type and modules with fibers of the second type, or cables in which one module comprises at the same time fibers of the first and second types (or of other known types) according to the specific service requirements. The jacket of the modules 1 is of a thermoplastic material, preferably extruded onto the fibers, for example a polyvinyl chloride or a fluorinated polymer and generally a fire-resistant thermoplastic material with limited smoke development or, again, a cross-linked acrylate, for example, by means of ultraviolet radiation. The thickness of the jacket is on the order of tenths of a millimeter (0.1–0.3 mm), so as to facilitate its removal for accessing the fibers and making the connections with other parts of the system, e.g. with the terminals of a computer.

The sheath 4 is preferably of a thermoplastic material and may be made, for example, with polyvinyl chloride, fluoridated polymers, polymer compounds in flame-retardant thermoplastic material with low smoke development (known in the industry as LSOHs), with suitable characteristics of flame resistance and strippability for connectorizing to other parts of the system.

The tensile-resistant yarns in the layer 5 have preferably a tensile modulus of at least 4000 kg/mm², so at to endow the cable with characteristics of tensile resistance and limited deformability suited to its intended use.

The yarns may be of the textile type or of other materials with characteristics comparable to textile yarns for flexibility and tensile resistance, such as fibers of glass, carbon, boron and similar.

Textile yarns are intended as a preassembled group of elementary filaments, of aramid (aromatic polyamide) fiber in the preferential embodiment.

Each textile yarn is identified by a count expressed in dTex, corresponding to the weight in grams of a 10 km length of yarn, and a corresponding tensile rigidity, measured in Newtons.

The number of yarns, their count and rigidity depends on the characteristics required of the cable.

As an example, for the applications described earlier, in the embodiments of the present invention, the number of yarns is typically between 6 and 12, the dTex count between 1580 and 2400 and the overall rigidity between 72,750 and 181,000 Newtons.

The thermoplastic sheath 4 is applied by extrusion onto the surface of the layer of tensile-resistant yarns 5.

In the examples of FIGS. 1 and 2, the final diameter "D" of the cable measured on the sheath 4 is less than 4 mm and in FIG. 3 less than 7 mm.

In a particular embodiment, the cable in FIG. 2 has a module with a maximum sectional dimension on the jacket 3 of 0.95 mm and a diameter measured on the sheath 4 of 2.5 mm.

In another embodiment, the cable in FIG. 3 has modules with the same sectional dimension as that cited for FIG. 2 and diameter on the sheath 4 of 5 mm. More generally, the embodiments according to the invention include cables with more modules, with a potential of 2 to 72 fibers, with sheath thickness of 0.4 to 1.5 mm and outside sheath diameter of 2 to 7 mm.

The method for manufacturing an optical cable with a core as illustrated in FIG. 1–3 includes the steps of advancing the core formed of a plurality of modules 1 continuously from a starting station to a collection station, extruding the sheath of thermoplastic material 4 around modules 1, cooling the sheath and collecting the core in the form of a coil or on a reel.

The procedure according to the invention comprises the following basic steps:

a) decouple modules 1 and sheath 4 by interposing between them a plurality of flexible, tensile-resistant yarns 5 subjected to pull from the starting station to the collection station;

b) make yarns 5 and sheath 4 uniformly adherent at the output of the sheath cooling step.

Phase a) favorably prevents the transmission of the contractions of the extruded sheath during the cooling step to the optical fibers of the modules with the negative result of greatly attenuating their transmission characteristics in the finished cable and in service.

The decoupling between sheath and modules is achieved thanks to the fact that the yarns are caused to advance with a predetermined pull between the two processing stations and the modules are caused to advance between the same two stations with a pull controlled by a special brake on the respective feed reels.

The result is that the yarns and modules advance in the same direction independently at a constant rate imposed by a special motor at the end of the line.

The sheath 4, extruded in the form of a plasticized mass, rests on a dense arrangement of yarns, inside of which the various modules 1 run. The cage formed by the yarns isolates the modules from the longitudinal contracting action of the sheath during the cooling step, allowing the sheath to transmit only a very limited radial contraction on the modules, if any, with a negligible effect on the transmission quality of the fibers.

Phase b) creates the uniform adherence between yarns 5 and sheath 4, by means of repeated flexures of the core following the sheath cooling step. The mechanical action of repeated flexures is believed to destroy any links between the sheath and the yarns caused by points of adherence or increased adhesion, distributed non-uniformly between yarns and sheath in both the longitudinal and circumferential directions.

Advantageously, eliminating the points of adherence or increased adhesion prevents contractions of the sheath, due either to the natural structural shrinkage of the material after extrusion (thermal shrinkage) or to ambient temperature variations, from causing curving of the filaments arranged between the points of adhesion when the cable is under operating conditions, with consequent pressure on the modules and negative alteration of the transmission characteristics of the fibers.

For the purposes of the present invention, uniform adherence means the absence of zones in which the adhesion between sheath and yarns is greater than in adjacent zones, strong enough to prevent contractions of the sheath, e.g. thermal in nature, from being distributed over the entire structure of the cable, in both the circumferential and longitudinal directions.

This result can be encouraged by either a virtual absence of adhesion between sheath and yarn or uniform adhesion of a controlled value.

FIGS. 4, 5 show an embodiment of the line for manufacturing the cable with an optical core as illustrated in FIGS. 1 to 3.

The line comprises a first section, extending from the starting station to the sheath extrusion area, an intermediate section where the extruded thermoplastic sheath is cooled, an additional operating section for obtaining uniform adherence between the sheath and the yarns and a final section comprising the means for pulling and collecting the cable.

In greater detail, the first section of the line includes a group 6 consisting of a number of decoilers 6a, 6b of optical modules 1 (two in the example shown) and a group 7 of decoilers of the yarns 5, both followed by means 8 for driving and positioning the modules and yarns at the entrance to an extruder 9, equipped with a head 10 into which the thermplastic material of the sheath is fed.

Each optical module 1 is subjected to controlled tension, created by a motor-driven decoiler, as is each yarn 5.

The drive and positioning means 8 distribute the modules 1 in a central position, in proximity to the axis of the extrusion head and yarns 5 according to a circular ring ordered within the extrusion head.

The thermoplastic material of the sheath is extruded onto the circumference created by the diameter of the yarn ring.

Immediately downstream from the extrusion zone is the intermediate section of the line, consisting of a water cooling tank 11, followed by an equalizing device 12, comprising means for creating the uniform adherence between yarns and sheath.

Preferably, cooling tank 11 comprises two sections, with hot water and water at ambient temperature, respectively.

The final section of the line comprises a drawing system 13, followed by a takeup reel 14 with controlled draw.

The thermoplastic material of the sheath is consolidated in the cooling tank, so that the cable reaches the takeup reel substantially at ambient temperature.

In said cooling zone the textile yarns, subject to traction independent of the optical modules, perform the aforesaid decoupling action between sheath and optical modules, preventing the transmission of stress to them resulting from the longitudinal contraction of the sheath in the cooling step.

In this same zone, a limited radial contraction of the sheath advantageously reduces the empty spaces between the yarns, creating conditions of uniform compaction, helpful for increase the strength of the cable.

The equalizing device 12, as said before, creates a state of uniform adherence between the sheath and the yarns, destroying possible local adherences or increases in adhesion along the cable, due, for example, to contract between the yarns and the melted polymer immediately downstream from the extrusion head.

The equalizing device 12, in a preferred embodiment, as shown in FIGS. 6 and 7, comprises a plurality of drive pulleys arranged in sequence with contiguous pulleys at different heights, such that the cable on its undulated path passes over them partially hugging the external surface of the pulleys, alternatively first with its external surface and then with its internal surface.

In particular, device 12 comprises at least a first plurality of pulleys arranged in one plane, followed by a second plurality of pulleys arranged in a plane angled with respect to the first.

Preferably, as shown in FIGS. 6 and 7, the device 12 comprises two series of pulleys 15, 16, arranged respectively on two mutually orthogonal planes, so as to obtain corresponding flexures of the cable in two orthogonal planes. The pulleys of the first series are preferably equal in number to those of the second series; also preferably, the diameters of the pulleys are all equal, within each series and between the two series.

As an example, the number of pulleys of one series is between 3 and 9, and the value of the diameter 'd' of the pulleys 15, 16 is between 20 and 40 times the diameter of the cable, causing a length 'L' of each series between 150 and 3000 mm.

In one embodiment, relative to the cables in FIGS. 1, 2 with diameter 'D' of around 2.5 mm, each of the two series comprises 7 pulleys, arranged in a section of length 'L' of around 550 mm, with diameter 'd' of each pulley around 90 mm.

Preferably, the distance between the two planes on which the centers of two contiguous pulleys are placed is between 1 and 2 times the diameter 'D' of each pulley.

Some tests were performed on cables of the type indicated, with the procedures indicated below.

Two cables were prepared like those in FIG. 2, each comprising a single optical module with four optical fibers, surrounded by a layer of textile yarns 5 in aramid fiber and an external sheath of polyvinyl chloride having an internal diameter of 1.5 mm and an external diameter of 2.5 mm.

The optical fibers employed in the optical modules were single-mode fibers, marketed under the designation SMR by Fibre Ottiche Sud F.O.S. S.p.A., with a nominal attenuation of 0.2 dB/km.

The optical module had a basically elliptical cross-section, with the larger dimension of around 0.95 mm and circumference of around 3 mm.

A first cable was produced without the use of the equalizing device 12 and a second cable, of the same structure, was produced with the equalizing device 12.

Specimens 500 mm long were cut from said cables and were subjected to testing to ascertain the force F required to strip module 1 from the rest of the cable specimen, consisting of the yarns 5 and the sheath 4.

A first test, diagrammed in FIG. 8, was performed to measure the force F1 necessary to strip module 1 from the rest of the cable specimen (i.e. yarns and sheath).

A second test, diagrammed in FIG. 9, was performed on the same types of cable to measure the force F2 necessary to strip the sheath from the remaining portion of the cable, composed of module 1 and yarns 5.

The testing conditions consisted of applying the load at a rate of 15 mm/minute and measuring the force necessary to strip the module and the sheath, respectively, first at startup and then under normal conditions, i.e. after overcoming the friction of first detachment. The stripping forces were measured in grams.

The results of the test are indicated in the following Table 1, the numbers 1 and 2 on the left indicating the tests with the cables produced without and with the equalizing device, respectively.

TABLE 1

| | Module stripping force | | Sheath stripping force | |
|---|---|---|---|---|
| | Startup value (g) | Normal (g) | Startup value (g) | Normal (g) |
| 1 | 105 | 85 | 2050 | 916 |
| 2 | 92 | 75 | 353 | 189 |

The results of the first test, shown on the left side of the table, indicate that the stripping load on the module with respect to the rest of the cable structure is practically unchanged whether the cable was produced with the equalizing device or without it.

In general, it is felt that said stripping load on the optical modules may vary between 50 and 150 g for each optical module and that the presence of the equalizing device results in changes of less than ±20% of said value. This result may be attributable to the fact that during the manufacture of the cable the optical modules remain in any case decoupled from the sheath.

The value of the stripping force on the module measured in the test, small but still existent, may be explained by the fact that the limited radial contraction of the sheath in the cooling process cause a certain compressive engagement of the sheath on the modules and said engagement results in a friction sufficient to generate the modest resistance to stripping indicated by the table data.

The results of the second test, shown on the right side of the table, show the effect of the equalizing device in generating a uniform adherence between sheath and yarns to obtain the desired transmission characteristics of the cable fibers.

In fact, the stripping force of the sheath with respect to the underlying filaments was observed to assume values much higher when the cable was produced without the equalizing device than when the cable was produced with the use of the equalizing device.

In particular, one may note from the table data that a stripping force without the use of the equalizing device was measured at around five times that measured for a cable produced with the equalizing device.

In general, it is believed that for cables according to the present invention the force required to strip the sheath from the underlying filaments is reduced by 4 to 10 times when the equalizing device is used on the line and that the unit value of said force (referred to the circumferential development of the contact surface between sheath and yarns) varies between 20 and 60 g/mm.

The result may be explained by considering that the action of the equalizing device, thanks to the repeated flexures of the cable, eliminated or reduces the zones of greatest adhesion between sheath and yarns, distributed non-uniformly along the cable, which result in points of local increase in the force required to strip the sheath from the remaining cable structure.

The elimination of these zones of abnormal adhesion, due for example to particular conditions of contact of the sheath material with the yarns in the extrusion process, results in uniform adherence between sheath and yarns, due essentially to friction alone, such that, despite the presence of contraction of the sheath material during extrusion or thermal contractions during cable service, the stress is uniformly distributed toward the inside of the cable, thus avoiding the risk of abnormal local curving of the cable, with high pressure on the fibers of each module.

Two sections 6 meters long of the test cables previously described, produced with and without the use of the equalizing device, respectively, were collected in coils with an average external diameter of 160 mm.

Kept in the configuration indicated, the cables were subjected to three successive thermal cycles for a duration of 4 hours per cycle.

In each cycle the temperature was caused to vary from +70° C. to −30° C. In particular, each cycle comprised 2 hours of permanence at +70° C. and 2 hours of permanence at −30° C. For the sake of brevity, said thermal cycle will be indicated here below as a thermal cycle of 4 hours between +70° C. and −300° C.

The purpose of the test was to determine the effects of the structural shrinkage of the sheath under various conditions of adherence between sheath and yarns. The final configurations assumed by the coils of the two cables are shown in FIGS. 10 and 11, for the cable produced with and without the equalizing device, respectively.

In the case of FIG. 10, after the thermal cycles there is a regular, concentric arrangement of the coils, with curvature essentially constant; the attenuation measured was less than 0.5 dB/km.

In the case of FIG. 11, after the thermal cycles an accentuated polygonal configuration of the cable coils was observed.

The attenuation was measured in the cables employed in the cables described above.

In particular, the cable subjected to equalization during its manufacture displayed an attenuation of $\leq 0.5$ dB/km at 1550 nm; after being subjected to three thermal cycles of 24 hours, each consisting of 12 hours of permanence at −10° C. and 12 hours of permanence at +60° C., it displayed an attenuation of <0.5 dB/km at 1550 nm, i.e. essentially unchanged. For the sake of brevity, this thermal cycle will be indicated below as "thermal cycle of 24 hours between −10 and +60° C.".

With the cable not subjected to equalization during manufacture the attenuation was measured, immediately after manufacture, at between 5 and 10 dB/km at 1550 nm; after the three thermal cycles of 24 hours between −10 and +60° C., as described above, the level of attenuation in the cable fibers reached such high values that it could not be measured with the available equipment (maximum dynamics of 15 dB at 1300 nm; the measurements were performed of cable specimens 500–1000 mm long).

A cable was also produced with an optical module of four fibers, in which 62.5/125 multi-mode fibers produced by Corning were used; the fibers used has a nominal attenuation of $\leq 1$ dB/km at 1310 nm.

Both immediately after manufacture and after being subjected to three thermal cycles of 24 hours each between −10 and +60° C., as described above, the cable displayed an attenuation of <1.5 dB/km at 1310 nm.

It is thus believed that the absence of the equalizing device leaves points of irregular adherence between sheath and yarns in the cable such that, following the thermal contractions of the sheath, the yarns are unable to slide between contiguous points of adherence with the sheath, causing a lack of uniformity in internal tensions and significant alterations of the geometrical arrangement such as to induce microbending stress in the fibers of the optical modules, responsible for the deterioration of transmission characteristics of the fibers observed during the testing.

The cables manufactured according to the invention displayed low values of attenuation of the optical signal; it is believed that these values are, in general, between the nominal value and about 3 times the nominal value of attenuation of the optical fiber employed.

Preferably, this includes cables with 1 to 7 optical modules, with 2 to 8 fibers per optical module, yarns of textile fiber (aramid fiber) or other materials with similar mechanical characteristics (flexibility, tensile resistance), such as glass fibers, carbon fibers, boron fibers or similar, sheath thickness between 0.4 and 1.5 mm, external sheath diameters between 2 and 7 mm; the sheath may be made, for example, of polyvinyl chloride, polyurethane, halogen-free elastomer compounds (known in the industry as LSOH compounds), fluorinated polymers, thermoplastic or cross-linked rubber and similar, according to the specific application requirements.

We claim:

1. Optical cable comprising:
   at least one optical module, comprising at least two optical fibers surrounded by a jacket of polymer material
   an extruded outer sheath enveloping said modules, and
   a strength member
   characterized by the fact that said strength member includes a plurality of tensile-resistant yarns which occupy the entire space between the optical modules and the outer sheath, in which said yarns adhere uniformly to the outer sheath, said optical modules being mechanically decoupled from said outer sheath.

2. Optical cable according to claim 1 characterized by the fact that the attenuation of the optical fibers of said optical modules is less than 3 times the enominal value of the optical fiber after at least a thermal cycle of 24 hours between −20 and +70° C.

3. Optical cable according to claim 1 characterized by the fact that its external diameter is between 2 and 7 mm.

4. Optical cable according to claim 1 characterized by the fact that said yarns have an elastic tensile modulus of at least 4000 kg/mm$^2$.

5. Optical cable according to claim 1 characterized by the fact that said yarns are of aramid fiber.

6. Optical cable according to claim 1 characterized by the fact that said outer sheath is of polyvinyl chloride.

7. Optical cable according to claim 1 characterized by the fact that the polymer material of the jacket of said optical modules is a cross-linked acrylic resin.

8. Optical cable according to claim 1 characterized by the fact that the polymer material of the jacket of said optical modules is a flame-retardant mixture.

9. Optical cable according to claim 1 characterized by the fact that the polymer material of the jacket of said optical modules is a thermoplastic resin.

10. Optical cable according to claim 1 characterized by the fact that said uniform adherence of said yarns to the outer sheath is such that in a section of cable 500 mm long a regular unit force of between 20 and 60 g/mm is necessary to strip the outer sheath from the remaining portion of the cable, comprising the yarns and the optical modules, when the stripping force is applied at a rate of 15 mm/min.

11. Optical cable according to claim 1 characterized by the fact that said uniform adherence of said yarns to the outer sheath is such that in a section of cable 500 mm long the regular unit force necessary to strip the outer sheath from the remainder of the cable, comprising the yarns and optical modules, is no greater than 4 times the regular unit force required to strip an optical modules from the remaining portion of the cable, comprising the yarns and the outer sheath.

12. Optical cable according to claim 1 characterized by the fact that in a section of cable 500 mm long the regular force necessary to strip an optical module from the remaining portion of cable, comprising the yarns and the outer sheath, is between 50 and 150 g per optical module, when the stripping force is applied at a velocity of 15 mm/min.

13. Optical cable according to claim 1 characterized by the fact that a coil of the cable in a configuration with at least two coils regularly in contact, with an external diameter of around 160 mm, displays no substantial polygonization when said coil is subject to at least one thermal cycle of 4 hours between +70 and −30° C.

14. Method for the manufacture of an optical cable for telecommunication, comprising at least one optical module with at least two fibers surrounded by a plastic jacket and a plastic sheath around the modules, which includes the steps of:

causing said optical module to continuously advance between a starting station and a collection station;

extruding a thermoplastic sheath around the optical module;

cooling said sheath, characterized by the fact that it comprises the steps of:

applying a layer of flexible, tensile-resistant yarns between module and sheath;

extruding said thermoplastic sheath over said yarns;

cooling said extruded sheath;

causing the yarns and sheath to uniformly adhere to each other by removing points of adherence between sheath and yarns after the cooling of said extruded sheath.

15. Method according to claim 14 characterized by the fact that said step of making the yarns and sheath adhere to each other uniformly comprises the flexing of said cable by at least 90°.

16. Method according to claim 15 characterized by the fact that said flexing step comprises at least one flexure in at least two distinct mutually incident planes.

17. Method according to claim 15 characterized by the fact that said flexures are executed in two mutually orthogonal planes.

18. Method according to claim 15 characterized by the fact that at least two flexures of roughly 180° each are executed in each plane, in opposite directions.

* * * * *

UNITED STATES PATENT AND TRADEMARK OFFICE
CERTIFICATE OF CORRECTION

PATENT NO.: 5,978,536

DATED: November 2, 1999

INVENTORS: BRANDI et al.

It is certified that an error appears in the above-identified patent and that said Letters Patent is hereby corrected as shown below:

Claim 11, Column 11, line 12, "an optical modules" should read --an optical module--.

Signed and Sealed this

Ninth Day of January, 2001

Attest:

Q. TODD DICKINSON

Attesting Officer                Commissioner of Patents and Trademarks